US010801375B2

(12) United States Patent
Otake et al.

(10) Patent No.: US 10,801,375 B2
(45) Date of Patent: Oct. 13, 2020

(54) VALVE OPENING-CLOSING TIMING CONTROL DEVICE

(71) Applicant: AISIN SEIKI KABUSHIKI KAISHA, Kariya-shi, Aichi-ken (JP)

(72) Inventors: Tomoharu Otake, Kariya (JP); Hiroki Mukaide, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/449,851

(22) Filed: Jun. 24, 2019

(65) Prior Publication Data

US 2020/0072095 A1    Mar. 5, 2020

(30) Foreign Application Priority Data

Sep. 5, 2018 (JP) ................. 2018-166384

(51) Int. Cl.
*F01L 1/352* (2006.01)
*F16H 1/32* (2006.01)
*F01L 1/047* (2006.01)

(52) U.S. Cl.
CPC ............. *F01L 1/352* (2013.01); *F01L 1/047* (2013.01); *F16H 1/32* (2013.01)

(58) Field of Classification Search
CPC . F16H 1/32; F01L 2013/103; F01L 2820/032; F01L 1/352; F01L 1/047; F01L 1/344; F01L 1/46
USPC ................. 123/90.15, 90.16, 90.17
See application file for complete search history.

(56) References Cited

U.S. PATENT DOCUMENTS

| 2005/0183682 A1* | 8/2005 | Uozaki | F01L 1/3442 |
| | | | 123/90.17 |
| 2010/0180845 A1* | 7/2010 | Kurisu | F01L 1/352 |
| | | | 123/90.17 |
| 2018/0073655 A1* | 3/2018 | Miyachi | F16K 31/048 |
| 2018/0073656 A1 | 3/2018 | Miyachi et al. | |

FOREIGN PATENT DOCUMENTS

| JP | 2009215954 A * | 9/2009 | |
| JP | 2009215954 A | 9/2009 | |
| JP | 2018044501 A | 3/2018 | |
| WO | WO-2017110172 A1 * | 6/2017 | F01L 1/352 |

* cited by examiner

*Primary Examiner* — Devon C Kramer
*Assistant Examiner* — Kelsey L Stanek
(74) *Attorney, Agent, or Firm* — Buchanan Ingersoll & Rooney PC

(57) ABSTRACT

A phase adjustment mechanism for setting a relative rotational phase of a driven-side rotational body to a drive-side rotational body of a valve opening-closing timing control device includes a output gear around a rotational axis, an input gear being rotated around an eccentric axis, and an eccentric member. The eccentric member includes an outer peripheral surface with a first arc portion, a second arc portion, a plate spring fitted between the first arc portion and the second arc portion, and a spaced portion. Each of the first arc portion and the second arc portion is disposed from a position less than 90 degrees to a position more than 90 degrees as a central angle with respect to the eccentric axis from a biasing direction of the plate spring in the peripheral direction.

8 Claims, 8 Drawing Sheets

VALVE OPENING-CLOSING TIMING CONTROL DEVICE

CROSS REFERENCE TO RELATED APPLICATIONS

This application is based on and claims priority under 35 U.S.C. § 119 to Japanese Patent Application 2018-166384, filed on Sep. 5, 2018, the entire content of which is incorporated herein by reference.

TECHNICAL FIELD

This disclosure generally relates to a valve opening-closing timing control device.

BACKGROUND DISCUSSION

There is known a valve opening-closing timing control device including a drive-side rotational body configured to synchronously rotate with a crankshaft of an internal combustion engine around a rotational axis, a driven-side rotational body configured to rotate coaxially with the rotational axis and integrally with a valve opening and closing camshaft of the internal combustion engine, and a phase adjustment mechanism configured to set a relative rotational phase of the driven-side rotational body with respect to the drive-side rotational body by driving force of an electric actuator. It is desirable to reduce noise in this type of valve opening-closing timing control device (for example, see JP2018-044501A (Reference 1)).

In a valve opening-closing timing control device described in Reference 1, a phase adjustment mechanism which sets a relative rotational phase between a drive-side rotational body and a driven-side rotational body includes a ring gear having an internal tooth portion and being centered on a rotational axis, an inner gear which is formed with an external tooth portion having a plurality of external teeth engaged with the internal tooth portion of the ring gear and is rotated around an eccentric axis, a drive shaft fitted into the inner gear (herein as an "eccentric member"), and a spring which applies biasing force in a direction where a part of the external tooth portion of the inner gear is engaged with a part of the internal tooth portion of the ring gear. A ball bearing is disposed between an inner periphery of the inner gear and the drive shaft, and the drive shaft and the inner gear are relatively rotatable around the eccentric axis. Moreover, the valve opening-closing timing control device includes displacement regulation portions which regulate a displacement of the inner gear in a direction orthogonal to a direction of biasing by the spring on the basis of the drive shaft. The displacement regulation portions are formed into slightly larger diameters from an outer peripheral surface of the drive shaft and are formed in such a way that the boundary between the upper outer peripheral surface and the lower outer peripheral surface has the largest diameter. The displacement regulation portions are formed by processing such as grinding to the drive shaft.

In the valve opening-closing timing control device, the abovementioned displacement regulation portions regulate a displacement of the inner gear in a direction orthogonal to a biasing direction of the inner gear. As a result, even when a gap is present between the internal tooth portion of the ring gear and the external tooth portion of the inner gear, a displacement of the inner gear in a direction where the gap between the internal tooth portion and the external tooth portion is reduced is regulated by a pair of the displacement regulation portions during driving of a phase control motor or at a time of generating cam fluctuation torque depending on a rotational fluctuation of the camshaft. This improves responsiveness of the valve opening-closing timing control device, prevents contact with the internal tooth portion and the external tooth portion, and generates no abnormal noise.

The displacement regulation portions of the valve opening-closing timing control device described in Reference 1 are formed by processing such as grinding and cutting to the drive shaft as mentioned above. For example, portions other than the displacement regulation portions in the entire outer periphery of the drive shaft are deeply cut and formed into elliptic shapes in which the displacement regulation portions form a major axis, and the displacement regulation portions can be formed into relatively slightly larger diameters than other portions on the outer peripheral surface of the drive shaft. However, a method of forming the displacement regulation portions into elliptic shapes is more expensive than a method of forming the displacement regulation portions into circular shapes. Therefore, improvement is desired.

A need thus exists for a valve opening-closing timing control device which is not susceptible to the drawback mentioned above.

SUMMARY

A feature configuration of a valve opening-closing timing control device according to this disclosure for achieving the above-described object includes a drive-side rotational body, a driven-side rotational body, and a phase adjustment mechanism. The drive-side rotational body is configured to synchronously rotate with a crankshaft of an internal combustion engine around a rotational axis. The driven-side rotational body is configured to rotate coaxially with the rotational axis and integrally with a valve opening and closing camshaft of the internal combustion engine. The phase adjustment mechanism is configured to set a relative rotational phase of the driven-side rotational body with respect to the drive-side rotational body by driving force of an electric actuator. The phase adjustment mechanism includes an eccentric member being rotated by the electric actuator and having an outer peripheral surface centered on an eccentric axis in a posture parallel to the rotational axis and with a predetermined amount of eccentricity with respect to the rotational axis, a first gear being disposed coaxially with the rotational axis, having a first cylindrical portion to which internal teeth portions are formed on an inner periphery, and being rotated integrally with the driven-side rotational body, and a second gear being externally fitted to the outer peripheral surface of the eccentric member and being rotated around the eccentric axis. The second gear includes a second cylindrical portion having an outer periphery formed with external teeth portions, the number of teeth of the external teeth portions being less than the number of teeth of the first gear, and an inner periphery into which the eccentric member is fitted, fits the second cylindrical portion inside the first cylindrical portion, applies a bias toward the first gear from inside of the second cylindrical portion by the eccentric member and engages with the first gear, and brings the eccentric axis to revolve around the rotational axis by rotation of the eccentric member, changes an engaging position with the first gear, and alters the relative rotational phase. The eccentric member includes the outer peripheral surface with a first arc portion entirely along the second cylindrical portion, a second arc portion entirely along the second cylindrical portion and discontinuous from an arc of the first arc portion, a biasing portion disposed between the first arc portion and the second arc portion in a peripheral direction of the eccentric member, and a spaced portion disposed between the first arc portion and the second arc portion on an opposite side of the biasing portion with respect to the eccentric axis and spaced away from the second cylindrical portion. Each of the first arc portion and the second arc portion is disposed from a position less than 90 degrees to a position more than 90 degrees at a central angle with respect to the eccentric axis from a biasing direction of the biasing portion in the peripheral direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments according to this disclosure will be explained with reference to FIGS. 1 to 8.

[Schematic Configuration of Valve Opening-Closing Timing Control Device]

Figure 1:
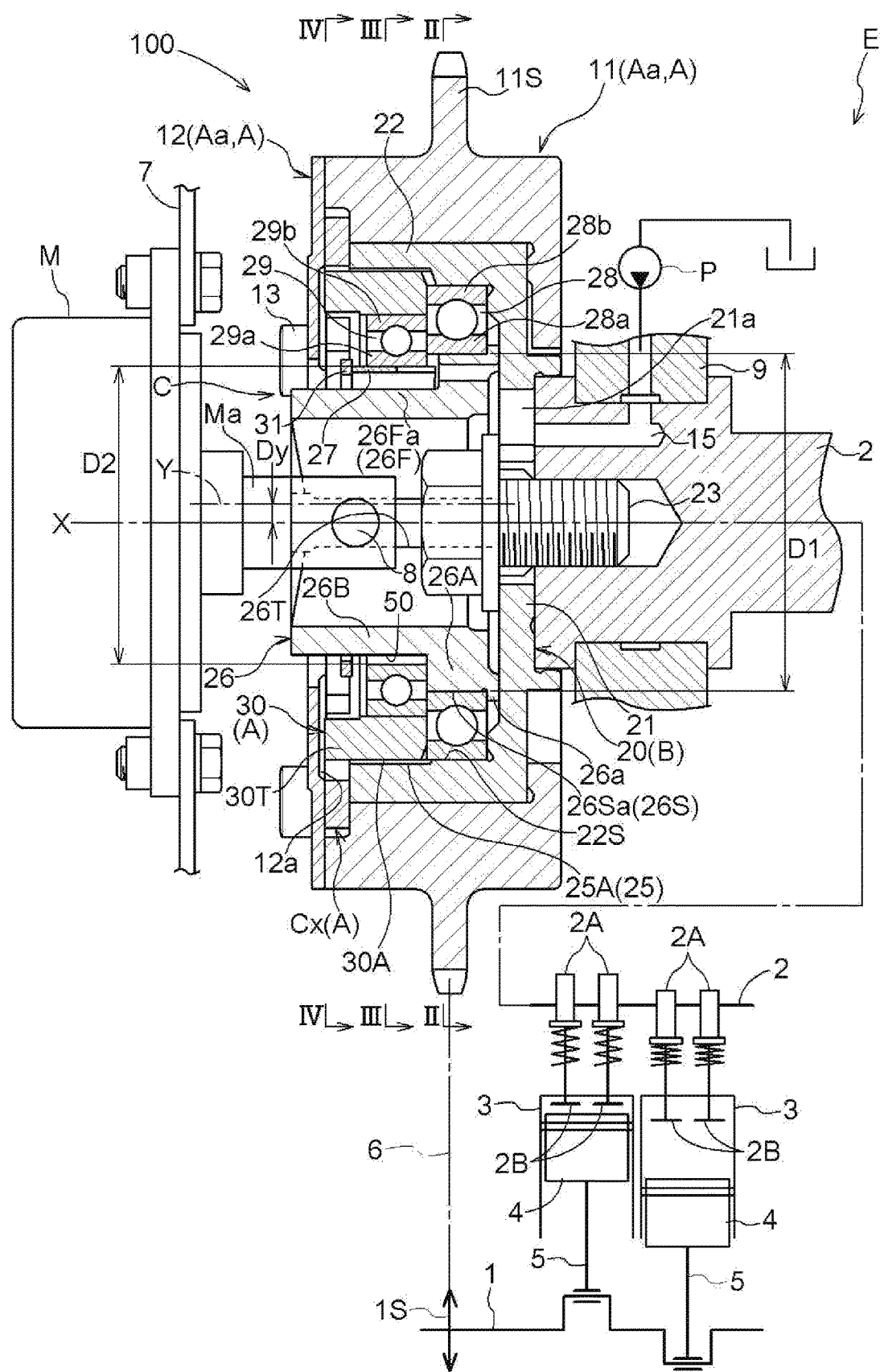
FIG. 1 is a cross sectional view illustrating a valve opening-closing timing control device.
Figure 5:
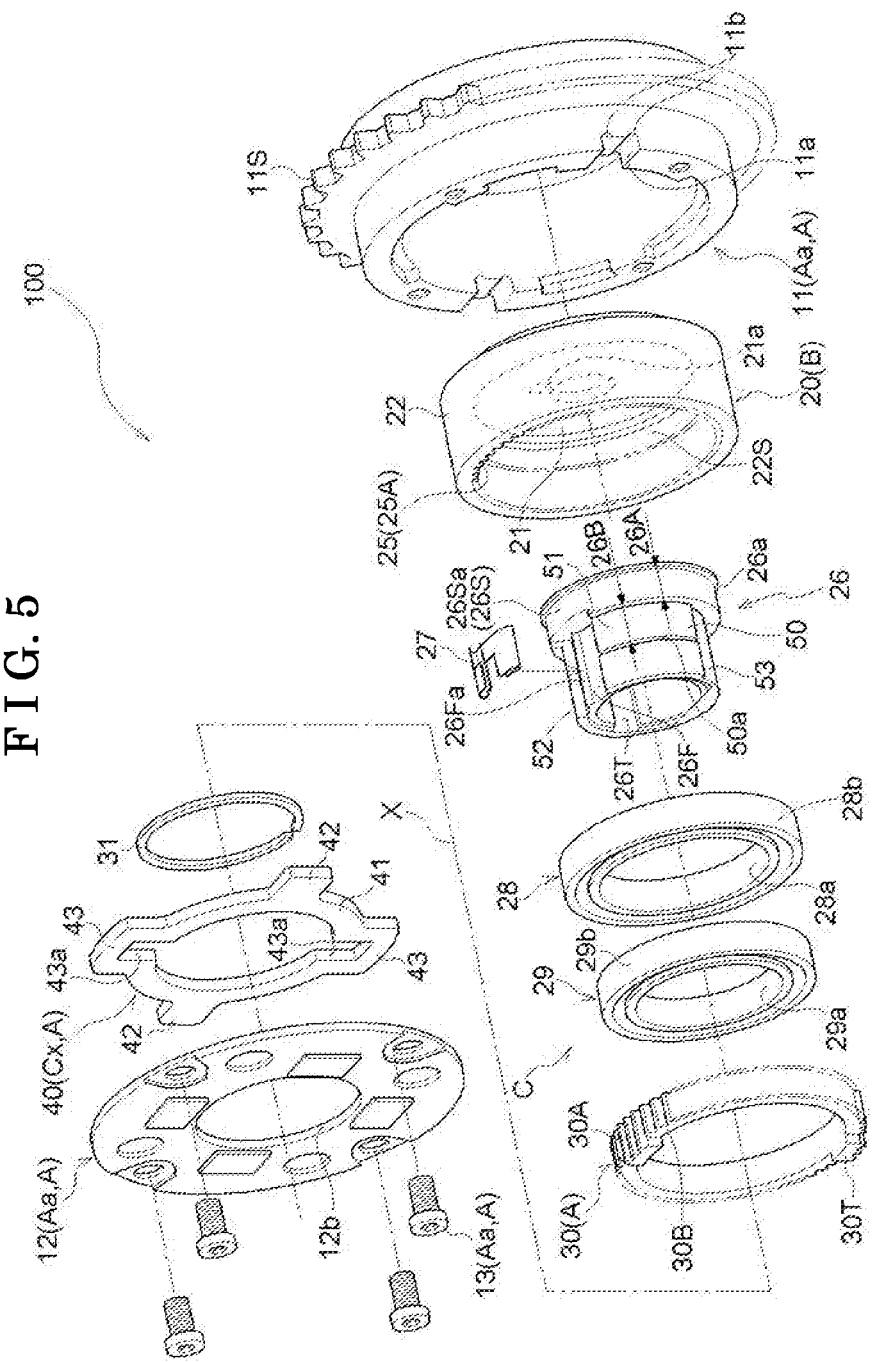
FIG. 5 is an exploded perspective view illustrating the valve opening-closing timing control device.

FIG. 1 illustrates a cross section of a valve opening-closing timing control device 100 according to this embodiment. FIG. 5 illustrates an exploded perspective view of the valve opening-closing timing control device 100.

As illustrated in FIG. 1, the valve opening-closing timing control device 100 includes a drive-side rotational body A configured to synchronously rotate around a rotational axis X with a crankshaft 1 of an engine E as an internal combustion engine, an intermediate member 20 (an example of a first gear) that serves as a driven-side rotational body B which is disposed on a radial inside of the drive-side rotational body A and is configured to rotate integrally with a valve opening and closing intake camshaft 2 (an example of a camshaft) of the engine E being centered on the rotational axis X, and a phase adjustment mechanism C configured to set a relative rotational phase of the driven-side rotational body B with respect to the drive-side rotational body A by driving force of an electric motor M (an example of an electric actuator). The valve opening-closing timing control device 100 is disposed between the motor M and the intake camshaft 2 in a direction along the rotational axis X.

The motor M is supported on the engine E by a supporting frame 7 in such a way that an output shaft Ma of the motor M is disposed coaxially with the rotational axis X. The output shaft Ma of the motor M is formed with a pair of engaging pins 8 in a posture orthogonal to the rotational axis X.

The engine E is configured in a four-cycle form in which pistons 4 are housed in a plurality of cylinders 3 formed in a cylinder block and each piston 4 is connected to the crankshaft 1 by a connecting rod 5. A timing chain 6 (which may be alternatively a timing belt, for example) is wound around an output sprocket 1S of the crankshaft 1 of the engine E and a driving sprocket 11S of the drive-side rotational body A. Therefore, rotation of the crankshaft 1 of the engine E is transferred to the drive-side rotational body A.

Therefore, when the engine E operates, the valve opening-closing timing control device 100 entirely rotates around the rotational axis X. Moreover, the driven-side rotational body B is configured to be relatively displaceable in the same rotation direction or in the reverse direction with respect to the drive-side rotational body A by operating the phase adjustment mechanism C (described later) by the driving force of the motor M. Because of the displacement, a relative rotational phase between the drive-side rotational body A and the driven-side rotational body B is set, and control of the opening and closing timing of intake valves 2B is achieved by cam portions 2A of the intake camshaft 2.

Note that an operation where the driven-side rotational body B is relatively displaced in the same direction as the rotational direction of the drive-side rotational body A is referred to as an advance angle operation, and the advance angle operation increases an intake compression ratio. Moreover, an operation where the driven-side rotational body B is relatively displaced in the reverse direction of the drive-side rotational body A is referred to as a retard angle operation, and the retard angle operation decreases the intake compression ratio.

The drive-side rotational body A includes a cylindrical main body Aa centered on the rotational axis X, and an input gear 30 (an example of a second gear) configured to synchronously rotate with the main body Aa.

The main body Aa is configured by fastening an outer case 11 having the driving sprocket 11S formed on an outer periphery, and a front plate 12 by a plurality of fastening bolts 13.

The outer case 11 has a bottomed-cylindrical shape with an opening at the bottom. The outer case 11 houses the intermediate member 20 and the phase adjustment mechanism C in a bottomed-cylindrical inner space.

The input gear 30 is connected to the main body Aa via an Oldham coupling Cx. Note that the Oldham coupling Cx is disposed between the intermediate member 20 and the front plate 12 in the rotational axis X direction.

[Description of Each Section]
[Phase Adjustment Mechanism]

As illustrated in FIGS. 1 to 5, the phase adjustment mechanism C is a hypo-cycloid gear deceleration mechanism which changes the relative rotational phase between the drive-side rotational body A and the driven-side rotational body B by the driving force of the motor M. The phase adjustment mechanism C includes the intermediate member 20, an eccentric member 26, and the input gear 30.

[Intermediate Member]

As illustrated in FIG. 1, the intermediate member 20 is a gear including a supporting wall portion 21 connected to the intake camshaft 2 in a posture orthogonal to the rotational axis X, a cylindrical wall portion 22 (an example of a first cylindrical portion) which is formed in a cylindrical shape centered on the rotational axis X and is protruded in a direction spaced away from the intake camshaft 2, and an output gear 25 having a plurality of internal teeth portions 25A formed on an inner peripheral surface of the cylindrical wall portion 22. The supporting wall portion 21 and the cylindrical wall portion 22 are integrally formed.

The intermediate member 20 is inserted relatively rotatably in a state where an outer surface of the cylindrical wall portion 22 comes into contact with an internal surface of the outer case 11. The intermediate member 20 is fixed to an end portion of the intake camshaft 2 by a connecting bolt 23 inserted through a through-hole in the middle of the supporting wall portion 21. This connection integrally rotates the intake camshaft 2 and the intermediate member 20.

The cylindrical wall portion 22 is disposed in such a way that an end portion outside (a side distant from the intake camshaft 2) in the direction along the rotational axis X is positioned further inside (a side close to the intake camshaft 2) than the front plate 12 in the direction along the rotational axis X.

A supporting surface 22S centered on the rotational axis X is formed inside (a position adjacent to the supporting wall portion 21) in the direction along the rotational axis X, in an inner periphery of the cylindrical wall portion 22. The output gear 25 centered on the rotational axis X is integrally formed outside (a side distant from the intake camshaft 2) in the direction along the rotational axis X than the supporting surface 22S.

An opening portion 21a configured to guide oil inside the eccentric member 26 is formed to a part of a surface which comes into contact with the intake camshaft 2, in the supporting wall portion 21.

[Input Gear]

As illustrated in FIGS. 1, and 3 to 5, the input gear 30 is a gear including a circular member 30B (a part of the second cylindrical portion) having a circular inner peripheral surface, and a plurality of external teeth portions 30A entirely formed in a peripheral direction on an outer periphery of the circular member 30B. The input gear 30 is radially supported by a second bearing 29 (a part of the second cylindrical portion) such as a ball bearing which fits inside the circular member 30B. The input gear 30 rotates around an eccentric axis Y in a posture parallel to the rotational axis X and being eccentric by a predetermined amount of eccentricity Dy with respect to the rotational axis X. A pair of engaging protrusions 30T are integrally formed to an end surface facing the front plate 12 of the input gear 30. An engaging width of the engaging protrusions 30T is set to be slightly narrower than an engaging width of an engaging concave portion 43a of an inner engaging arm 43 (to be described later).

Figure 3:
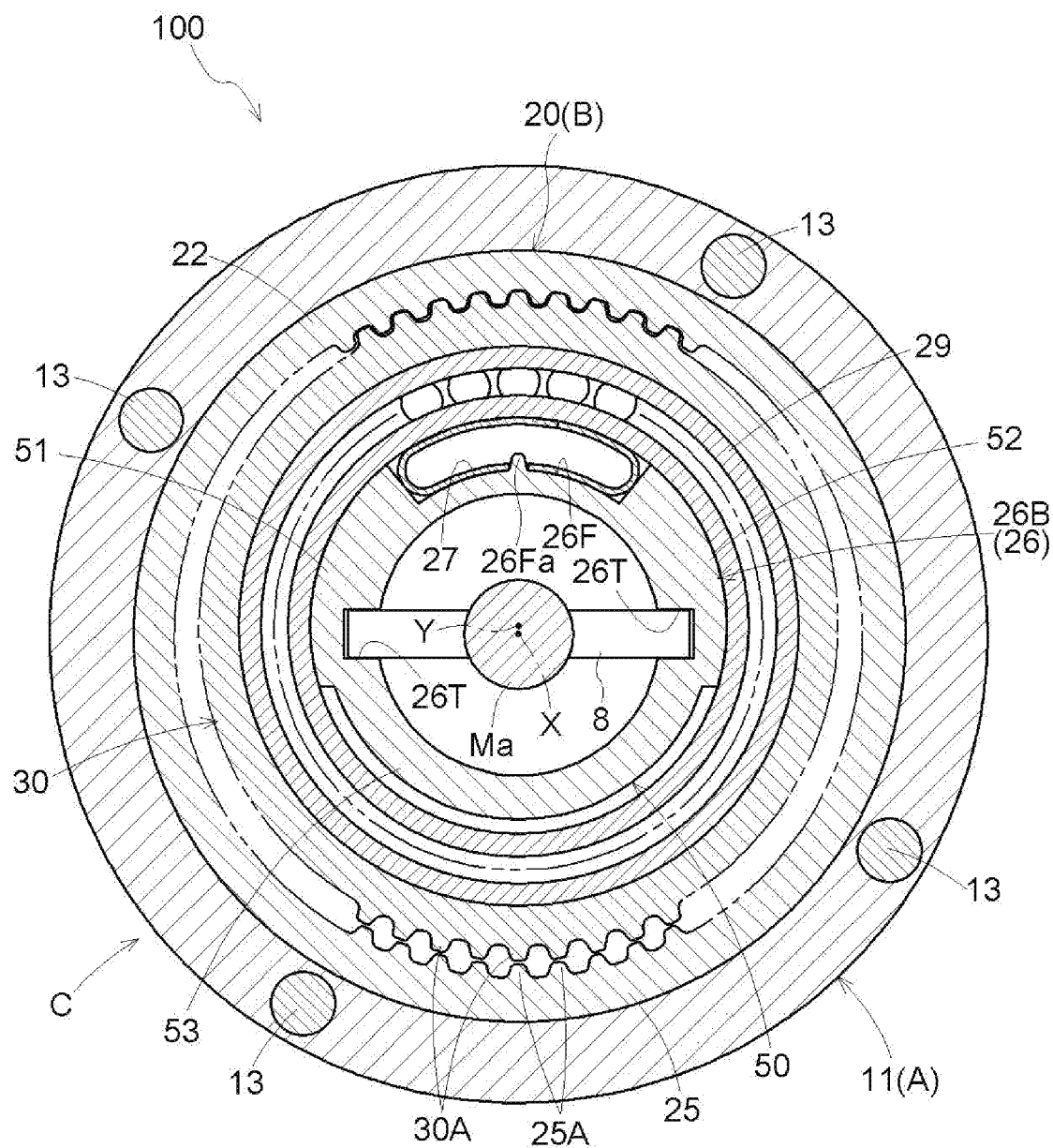
FIG. 3 is a cross sectional view taken along a line III-Ill of FIG. 1.

As illustrated in FIGS. 3 and 5, the number of teeth of the external teeth portions 30A is set to be less by one than the number of teeth of the internal teeth portions 25A of the output gear 25. A part of the external teeth portions 30A is engaged with a part of the internal teeth portions 25A of the output gear 25.

[Eccentric Member, and the Like]

As illustrated in FIG. 1, the eccentric member 26 is a cylindrical member being rotated by the motor M and having an outer peripheral surface centered on the eccentric axis Y in a posture parallel to the rotational axis X and with the predetermined amount of eccentricity Dy with respect to the rotational axis X. The eccentric member 26 is formed by grinding or cutting a sintered compact of a powder metal, for example. As illustrated in FIGS. 1 and 3, the eccentric member 26 integrally rotates with the output shaft Ma of the motor M. The eccentric member 26 is relatively rotatably supported around the rotational axis X with respect to the intermediate member 20 by a first bearing 28 such as a ball bearing. The eccentric member 26, fitted into an inner ring 29a of the second bearing 29, supports the input gear 30 via the second bearing 29.

Figure 4:
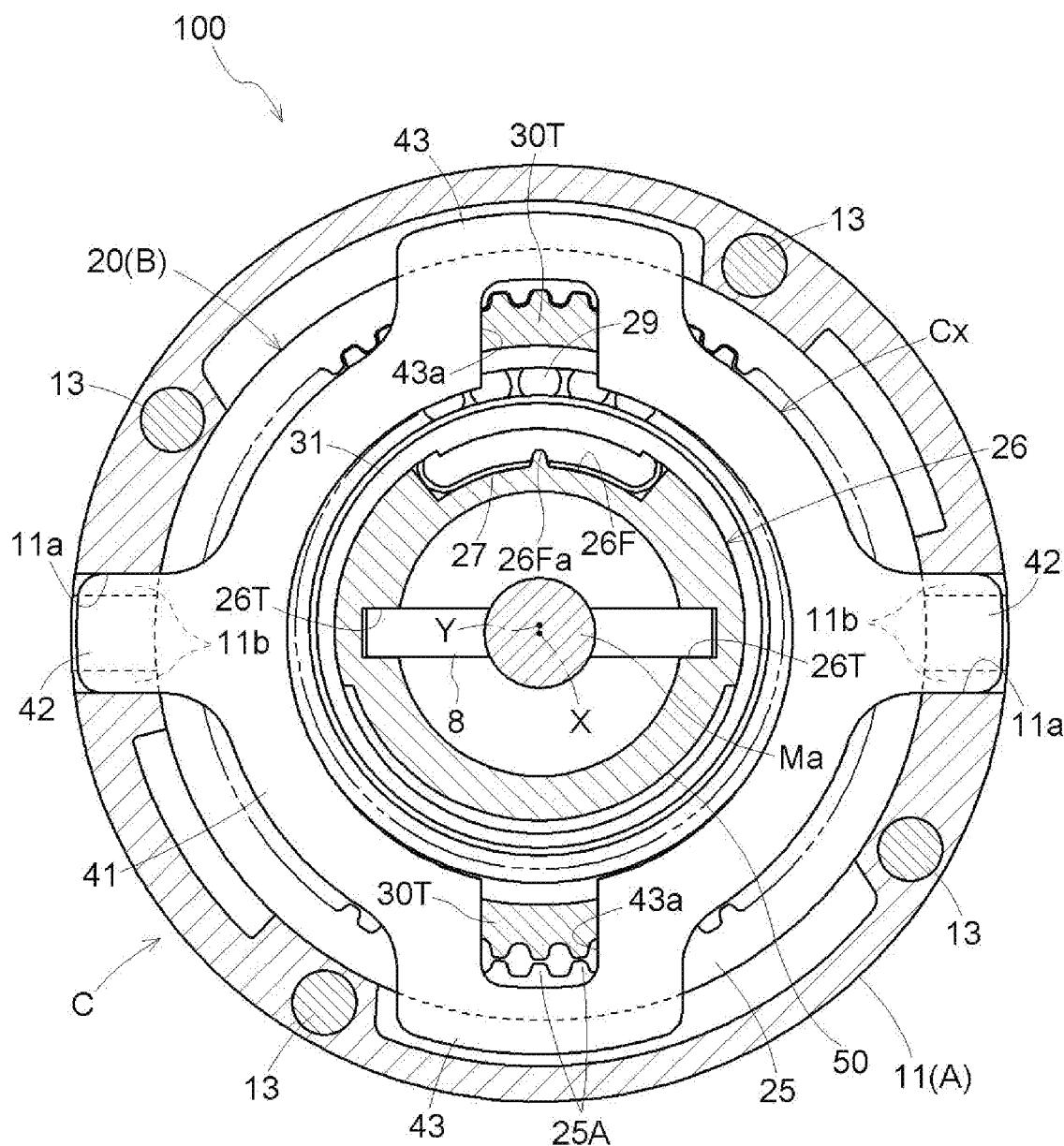
FIG. 4 is a cross sectional view taken along a line IV-IV of FIG. 1.

A pair of engaging grooves 26T engaged with each of a pair of engaging pins 8 of the output shaft Ma of the motor M are formed on an inner periphery of the eccentric member 26 in a posture parallel to the rotational axis X (see FIG. 4). The output shaft Ma is inserted into the eccentric member 26, and the engaging pins 8 are fitted in and engaged with the engaging grooves 26T, which makes it possible to transfer rotational power of the motor M to the eccentric member 26 from the output shaft Ma of the motor M.

As illustrated in FIGS. 1 and 5, the eccentric member 26 includes a first outer peripheral portion 26A inside (a side close to the intake camshaft 2) in the direction along the rotational axis X, and a second outer peripheral portion 26B outside (a side distant from the intake camshaft 2) in the direction along the rotational axis X.

Figure 6:
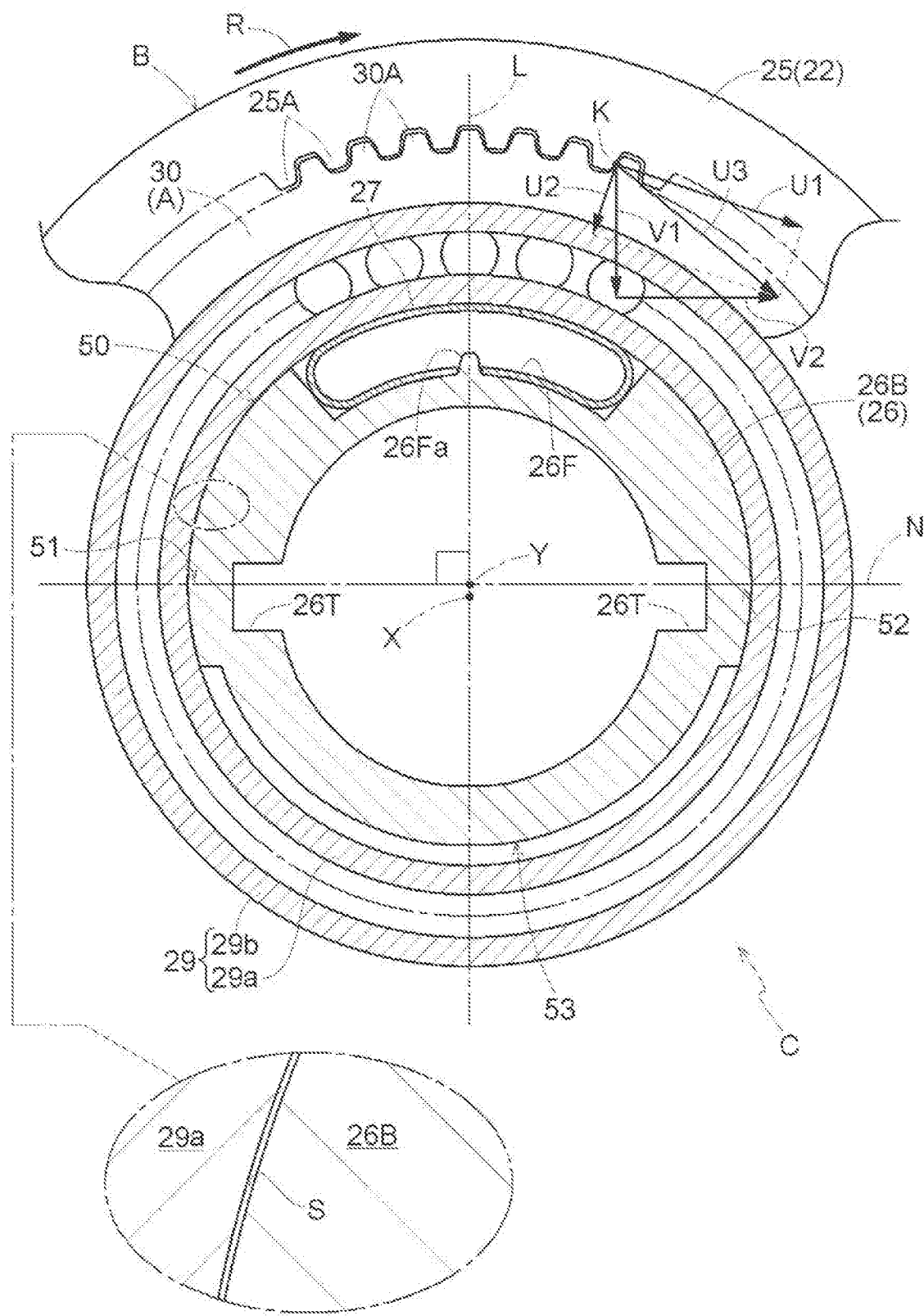
FIG. 6 is an explanatory diagram illustrating a structure of an eccentric supporting surface and regulation of a displacement of an input gear by the eccentric supporting surface.

As illustrated in FIGS. 3 and 6, the second outer peripheral portion 26B supports a radial inside of the drive-side rotational body A (the input gear 30). An eccentric supporting surface 50 being an outer peripheral surface (an entire peripheral surface) of the second outer peripheral portion 26B is centered on the eccentric axis Y in a posture parallel to the rotational axis X and is eccentric to the rotational axis X. The second outer peripheral portion 26B includes a first arc portion 51, a concave portion 26F (an example of a biasing portion) into which a plate spring 27 (an example of an elastic member) is fitted, a second arc portion 52, and a spaced portion 53 in the peripheral direction in this order. Note that an outer surface among the first arc portion 51, the second arc portion 52, the concave portion 26F (an example of a biasing portion), and the spaced portion 53 is included in the eccentric supporting surface 50. The first arc portion 51, the second arc portion 52, and the spaced portion 53 will be described later.

As illustrated in FIGS. 1 and 5, the first outer peripheral portion 26A supports a radial inside of the driven-side rotational body B (the intermediate member 20). The first outer peripheral portion 26A is formed with a projecting portion 26S protruded radially outward beyond a radial outer surface of the plate spring 27. An outer peripheral surface of the projecting portion 26S is formed with a circumference supporting surface 26Sa centered on the rotational axis X (see FIG. 2).

An end portion inside (a side of the supporting wall portion 21) in a direction along the rotational axis X of the eccentric member 26 is formed with a circular projection 26a protruded radially outward. The projection 26a is caught between the supporting wall portion 21 of the driven-side rotational body B and the first bearing 28 in the direction along the rotational axis X and has a function of preventing a fall of the eccentric member 26.

Figure 2:
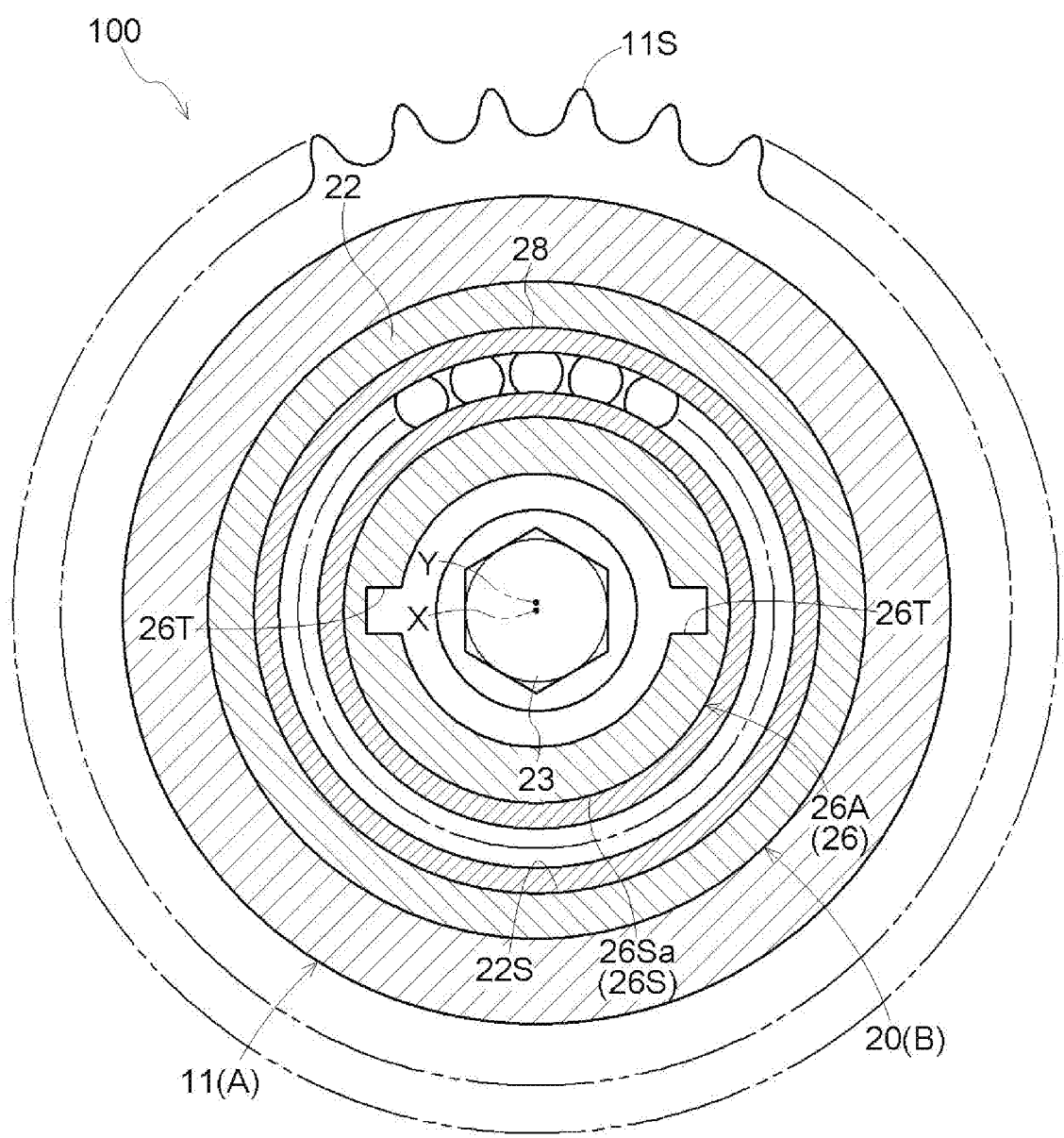
FIG. 2 is a cross sectional view taken along a line II-II of FIG. 1.

As illustrated in FIGS. 1 to 3, the circumference supporting surface 26Sa of the eccentric member 26 is press-fitted on an inner peripheral side of an inner ring 28a of the first bearing 28, and is radially supported by the first bearing 28. Then, an outer peripheral surface of an outer ring 28b of the first bearing 28 is press-fitted in the supporting surface 22S of the cylindrical wall portion 22 of the driven-side rotational body B (the intermediate member 20), and the first bearing 28 is radially supported by the cylindrical wall portion 22. The first bearing 28 will be described later.

As illustrated in FIGS. 1, 3, 5 and 6, the eccentric supporting surface 50 of the eccentric member 26 is fitted into the inner ring 29a of the second bearing 29. The eccentric supporting surface 50 biases the second bearing 29 by the plate spring 27 fitted into the concave portion 26F. An outer peripheral surface of an outer ring 29b of the second bearing 29 is press-fitted into an inner peripheral side of the input gear 30, and the input gear 30 is in a positional relationship externally fitted to an outer peripheral surface (the eccentric supporting surface 50) of the eccentric member 26. Therefore, the eccentric member 26 radially supports the second bearing 29, and the second bearing 29 radially supports the input gear 30. That is, as illustrated in FIGS. 1 and 2, the input gear 30 is supported to the eccentric supporting surface 50 of the eccentric member 26 via the second bearing 29, and a part of the external teeth portions 30A of the input gear 30 is engaged with a part of the internal teeth portions 25A of the output gear 25 by biasing force of the plate spring 27. The plate spring 27 and the second bearing 29 will be described later.

Note that, as illustrated in FIG. 1, the circumference supporting surface 26Sa of the projecting portion 26S protrudes radially outward beyond the radial outer surface of the plate spring 27, and thereby the plate spring 27 is spaced away from the first bearing 28 and is prevented from brining into sliding contact with the first bearing 28, by the projecting portion 26S.

In the eccentric member 26, as illustrated in FIGS. 3 and 6, an outer peripheral surface (a part of the eccentric supporting surface 50) of the first arc portion 51 and the second arc portion 52 is in contact with a part of an inner peripheral surface of the inner ring 29a of the second bearing 29 in a fitted state by reaction force of biasing force where the plate spring 27 biases the second bearing 29. This regulates a displacement of the second bearing 29 and the input gear 30 in a direction orthogonal to the biasing direction of the plate spring 27.

Depending on the relationship among the intermediate member 20, the first bearing 28, the eccentric member 26, the plate spring 27, the second bearing 29 and the input gear 30 as described above, the biasing force of the plate spring 27 is applied only between the eccentric member 26 and the intermediate member 20, and is not applied to an external member.

Therefore, a deformation or a displacement of an external member with respect to the biasing force of the plate spring 27 does not have to be considered. This allows for maintaining a posture of the eccentric member 26 at high precision.

The first bearing 28 will be described in detail. As illustrated in FIGS. 2 and 5, the first bearing 28 is a circular bearing having the inner ring 28a and the outer ring 28b. The first bearing 28 is disposed between a radial inside of the driven-side rotational body B (the intermediate member 20) and a radial outside of the first outer peripheral portion 26A of the eccentric member 26. The first bearing 28 is supported on the driven-side rotational body B and supports the eccentric member 26.

The second bearing 29 will be described in detail. As illustrated in FIGS. 3 and 5, the second bearing 29 is a circular bearing having the inner ring 29a and the outer ring 29b. The second bearing 29 is disposed between a radial inside of the drive-side rotational body A (the input gear 30) and a radial outside of the second outer peripheral portion 26B of the eccentric member 26. The second bearing 29 is supported on the eccentric member 26 and supports the input gear 30. Note that the second bearing 29 is prevented from falling by fixing, in a state of fitting, a fixing ring 31 (see FIG. 5) being a C-shaped circular member into a circular groove 50a entirely formed in the peripheral direction further outside (a side distant from the intake camshaft 2) than the eccentric supporting surface 50 of the eccentric member 26, in the rotational axis X direction (see FIG. 5).

In this embodiment, as illustrated in FIG. 1, an inner diameter D1 of the first bearing 28 being a diameter of an inner peripheral surface of the inner ring 28a of the first bearing 28 is configured to be larger than a value obtained by adding two times the amount of eccentricity Dy to an inner diameter D2 of the second bearing 29 being a diameter of the inner peripheral surface of the inner ring 29a of the second bearing 29. Moreover, the plate spring 27 and the first bearing 28 are partially overlapped as viewed in a radial direction. Therefore, the first bearing 28 and the second bearing 29 are adjacent to each other in the rotational axis X direction.

The plate spring 27 will be described in detail. As illustrated in FIGS. 3, 5, and 6, the plate spring 27 is an elastic member configured with such a pair of bending members that a spring plate member is bent into a U-shaped form. The pair of bending members of the plate spring 27 are placed at a predetermined position by a guide protrusion portion 26Fa formed to the concave portion 26F of the eccentric supporting surface 50. The plate spring 27 applies biasing force to the input gear 30 in such a way that a part of the external teeth portions 30A of the input gear 30 is engaged with a part of the internal teeth portions 25A of the output gear 25. The biasing force of the plate spring 27 allows for preventing backlash occurring in an engagement portion between the input gear 30 and the output gear 25.

In this embodiment, a length of the plate spring 27 in the rotational axis X direction is configured to be larger than a length of the second bearing 29 in the rotational axis X direction, and a positional relationship between the plate spring 27 and the second bearing 29 is regulated in such a way that a center of the plate spring 27 along the rotational axis X direction corresponds to a center of the second bearing 29 along the rotational axis X direction (see FIG. 1). This allows for uniformly applying the biasing force of the plate spring 27 to the second bearing 29 and reliably preventing backlash from occurring in the engagement portion between the input gear 30 and the output gear 25.

[First Arc Portion, Second Arc Portion, and Spaced Portion in Eccentric Member]

As illustrated in FIG. 6, as mentioned above, the eccentric member 26 includes the eccentric supporting surface 50, and includes the concave portion 26F (an example of a biasing portion), the first arc portion 51, the spaced portion 53, and the second arc portion 52 in the peripheral direction in this order. In FIG. 6, a line L is an imaginary line which passes through the eccentric axis Y along the biasing direction of the plate spring 27 fitted into the concave portion 26F. Moreover, a line N is an imaginary line which is orthogonal to the line L and passes through the eccentric axis Y.

Hereinafter, for better describing a functional effect of the first arc portion 51, the second arc portion 52, and the spaced portion 53, description will be made by illustrating a state where cam fluctuation torque R is applied as illustrated in FIG. 6 at a time of rotating the valve opening-closing timing control device 100. Note that the cam fluctuation torque R is torque exerted to the driven-side rotational body B (the intermediate member 20 and the output gear 25) depending on a fluctuation of a rotational speed of the intake camshaft 2.

The internal teeth portions 25A of the output gear 25 most strongly come into contact with the external teeth portions 30A of the input gear 30 on a downstream side of a direction where the cam fluctuation torque R is applied (a peripheral direction of the eccentric member 26). When indicating a relationship of force as a vector by defining a position at which a tooth surface of the internal teeth portions 25A and a tooth surface of the external teeth portions 30A most strongly come into contact with each other as a contact point K, cam torque U1 is applied in a tangential direction on the basis of the contact point K and central direction force U2 is applied from the contact point K toward the direction of the rotational axis X, whereby resultant force U3 is conceivable. Moreover, eccentric direction force V1 is applied to the contact point K in a direction against the biasing force of the plate spring 27 between the output gear 25 and the input gear 30, and horizontal direction force V2 is present between the eccentric direction force V1 and the resultant force U3. Note that the absolute value of the eccentric direction force V1 and the absolute value of the biasing force applied in the biasing direction are equal to each other.

Since a value of the cam fluctuation torque R increases or decreases according to a fluctuation of the rotational speed of the intake camshaft 2, the horizontal direction force V2 also increases or decreases. Therefore, the horizontal direction force V2 causes the input gear 30 to vibrate in a direction orthogonal to the line L. For this reason, the input gear 30 is deviated to vibrate by an action of the cam fluctuation torque R.

The relative movement of the input gear 30 in a direction along the line N by the fluctuation of the cam fluctuation torque R or the relative movement of the input gear 30 in the direction along the line N at a time of driving the motor M may cause the internal teeth portions 25A and the external teeth portions 30A to be into contact with or collide with each other and generate abnormal noise. However, as described later, the first arc portion 51 and the second arc portion 52 regulate the relative movement of the input gear 30 in the direction along the line N and prevent generation of abnormal noise.

The first arc portion 51 is a part of the eccentric member 26 and includes an outer peripheral surface formed in an arc shape. The outer peripheral surface of the first arc portion 51 is provided entirely along an inner peripheral surface of the second bearing 29 (an inner peripheral surface of the inner ring 29a) which serves as the second cylindrical portion. Only a small space S to some extent without generating backlash to the second bearing 29 is provided between the first arc portion 51 and the inner peripheral surface of the second bearing 29. In other words, the first arc portion 51 entirely loosely comes into contact with the inner peripheral surface of the second bearing 29 to some extent without generating backlash. The first arc portion 51 is disposed from a position less than 90 degrees (for example, a position of 35 degrees) to a position more than 90 degrees (a position of 105 degrees) at one side as a central angle with respect to the eccentric axis Y, from the plate spring 27 side of the concave portion 26F in the line L, in the peripheral direction of the eccentric member 26 (the same as a rotational direction).

The second arc portion 52 is a part of the eccentric member 26 and includes an outer peripheral surface formed in an arc shape. The outer peripheral surface of the second arc portion 52 is provided entirely along an inner peripheral surface of the second bearing 29 (an inner peripheral surface of the inner ring 29a) which serves as the second cylindrical portion. Only a small space S to some extent without generating backlash to the second bearing 29 is provided between the second arc portion 52 and the inner peripheral surface of the second bearing 29. In other words, the second arc portion 52 entirely loosely comes into contact with the inner peripheral surface of the second bearing 29 to some extent without generating backlash. The second arc portion 52 is disposed from a position less than 90 degrees to a position more than 90 degrees on the other side opposite to the first arc portion 51 as a central angle with respect to the eccentric axis Y, from the plate spring 27 side in the line L, in the peripheral direction of the eccentric member 26 (the same as a rotational direction). That is, a central angle centered on the eccentric axis Y from an end portion on the opposite side of the concave portion 26F of the first arc portion 51 to an end portion on the opposite side of the concave portion 26F of the second arc portion 52 exceeds 180 degrees.

The second arc portion 52 is discontinuous from the first arc portion 51 and is provided separate from the first arc portion 51. An outer periphery of the first arc portion 51 and the second arc portion 52 is overlapped with an arc of the same imaginary circle (not illustrated, hereinafter simply described as an imaginary circle) centered on the eccentric axis Y. Note that the imaginary circle can be internally fitted into the second bearing 29 and is along the inner peripheral surface of the second bearing 29 so as to generate only a small space, and has a radius substantially same as that of the inner peripheral surface. In this embodiment, arc lengths of the first arc portion 51 and the second arc portion 52 are the same as each other, but may be different from each other.

The first arc portion 51 and the second arc portion 52 are cutting surfaces obtained by cutting out, as arc surfaces, by an NC lathe or cylindrical polishing, a portion to be processed to the eccentric supporting surface 50 (specifically, portions to be processed to the first arc portion 51 and the second arc portion 52) in a precursor of the eccentric member 26 formed by sintering of a powder metal. Therefore, the first arc portion 51 and the second arc portion 52 have high roundness and are highly precisely overlapped with an arc of the imaginary circle having the same diameter as that of the eccentric supporting surface 50 of the eccentric member 26.

The eccentric member 26 is supported inside the second bearing 29 at three points by the first arc portion 51, the second arc portion 52, and the plate spring 27 in a state where the eccentric member 26 fits inside the second bearing 29. The eccentric member 26 regulates relative movement in the direction along the line N with respect to the second bearing 29 by the first arc portion 51 and the second arc portion 52. In other words, the second bearing 29 and the input gear 30 receive regulation of the relative movement in the direction along the line N with respect to the eccentric member 26. The first arc portion 51 and the second arc portion 52 are highly precisely overlapped with an arc of the imaginary circle having the same diameter, which prevents the input gear 30 or the eccentric member 26 from generating backlash in the direction along the line N. This avoids contact and collision with the internal teeth portions 25A and the external teeth portions 30A by the relative movement of the input gear 30 in the direction along the line N and prevents generation of abnormal noise with the collision, which makes it possible to achieve noise reduction in the valve opening-closing timing control device 100.

The spaced portion 53 is a part of the eccentric member 26. The spaced portion 53 is disposed on the opposite side of the concave portion 26F with respect to the eccentric axis Y. The spaced portion 53 is spaced away from the inner peripheral surface of the second bearing 29 and forms a space having a predetermined width, and thus allows movement of the second bearing 29 along the line L with respect to the eccentric member 26. This prevents abnormal noise and allows for movement of the input gear 30 (the second bearing 29) in a direction coming close to the output gear 25 along the line L according to wear-down of the internal teeth portions 25A and the external teeth portions 30A. In this embodiment, the spaced portion 53 is formed in an arc shape smaller than a radius of curvature of the arc of the outer periphery of the first arc portion 51 and the second arc portion 52 around the eccentric axis Y. An outer peripheral surface of the spaced portion 53 is continuous via a step portion from the first arc portion 51. Similarly, the outer peripheral surface of the spaced portion 53 is continuous via a step portion from the second arc portion 52.

The spaced portion 53 may use a shape of the precursor of the eccentric member 26 as it is. For example, it is only necessary that a shape according to the spaced portion 53 be previously formed to a mold or the like at a time of sintering the precursor of the eccentric member 26, and a portion to be formed as the spaced portion 53 be formed to the precursor at a stage where the precursor of the eccentric member 26 is sintered. Surface roughness of the outer peripheral surface of the spaced portion 53 is higher than surface roughness of the outer peripheral surface of the first arc portion 51 and the second arc portion 52 formed by cutting or the like (surface roughness of the outer peripheral surface of the first arc portion 51 and the second arc portion 52 is smaller than surface roughness of the outer peripheral surface of the spaced portion 53). However, the spaced portion 53 only needs to have a space between the eccentric member 26 and the inside of the second bearing 29, and the surface roughness and roundness of the spaced portion 53 do not affect a function of the eccentric member 26 and the second bearing 29. Note that a burr and the like of the spaced portion 53 need to be removed.

[Oldham Coupling, and the Like]

As illustrated in FIGS. 1, 4, and 5, the Oldham coupling Cx is a plate-shaped joint member. The Oldham coupling Cx is disposed outside (a side distant from the intake camshaft 2) from both the first bearing 28 and the second bearing 29 in the rotational axis X direction and inside (a side close to the intake camshaft 2) from the front plate 12 in the rotational axis X direction.

The Oldham coupling Cx includes a central circular portion 41, a pair of external engaging arms 42 protruded radially outward along one direction (the horizontal direction in FIG. 4) from the circular portion 41, and internal engaging arms 43 protruded radially outward along a direction orthogonal to the one direction from the circular portion 41. The circular portion 41, the external engaging arms 42, and the internal engaging arms 43 are integrally formed. Each of a pair of the internal engaging arms 43 is formed with the engaging concave portion 43a continuous to an opening of the circular portion 41.

A pair of guiding groove portions 11a which extends radially around the rotational axis X to an outer space from an inner space of the outer case 11 are formed, in a through-groove shape, to an opening edge portion which comes into contact with the front plate 12 of the outer case 11. A groove width of the guiding groove portions 11a is set slightly larger than a width of the external engaging arms 42, and each of the guiding groove portions 11a is cut out and forms a pair of discharge flow paths 11b which discharge lubricating oil.

The Oldham coupling Cx connects the input gear 30 to the main body Aa by engaging a pair of the external engaging arms 42 with a pair of the guiding groove portions 11a of the outer case 11 and engaging the engaging concave portions 43a of a pair of the internal engaging arms 43 of the Oldham coupling Cx with a pair of the engaging protrusions 30T of the input gear 30.

Note that the Oldham coupling Cx can be displaced in a direction (the horizontal direction in FIG. 4) where the external engaging arm 42 protrudes with respect to the outer case 11. The input gear 30 can be displaced in a direction (the vertical direction in FIG. 4) along a direction where the engaging concave portion 43a of the internal engaging arm 43 is formed with respect to the Oldham coupling Cx. As illustrated in FIG. 1, the front plate 12 is disposed on the outward side of the Oldham coupling Cx, and thereby the Oldham coupling Cx can be moved in a direction orthogonal to the rotational axis X in a state of coming into contact with an inner surface of the front plate 12.

As illustrated in FIG. 1, lubricating oil supplied from an oil pump P is supplied into an inner space of the eccentric member 26 from a lubricating oil path 15 of the intake camshaft 2 via the opening portion 21a of the supporting wall portion 21 of the intermediate member 20.

The lubricating oil thus supplied into the inner space of the eccentric member 26 is supplied to the first bearing 28 from a space between the projection 26a of the eccentric member 26 and the supporting wall portion 21 of the driven-side rotational body B by centrifugal force by rotation of the eccentric member 26, which operates the first bearing 28 smoothly. Moreover, the lubricating oil supplied into the inner space of the eccentric member 26 is supplied to the Oldham coupling Cx by centrifugal force by rotation of the eccentric member 26, is supplied to the second bearing 29, and is supplied between the internal teeth portions 25A of the output gear 25 and the external teeth portions 30A of the input gear 30. Then, the lubricating oil supplied to the Oldham coupling Cx is discharged to outside from a space between the external engaging arms 42 of the Oldham coupling Cx and the guiding groove portions 11a of the outer case 11.

Note that, in a case where the engine E in a stop state in a cold environment is started, internal lubricating oil is rapidly discharged via the discharge flow paths 11b of the guiding groove portions 11a by centrifugal force. This discharges high viscosity lubricating oil in a short time, eliminates influence of viscosity of lubricating oil, and achieves a rapid operation of the phase adjustment mechanism C.

[Aspect of Operation of Phase Adjustment Mechanism]

The motor M is controlled by a control device (not illustrated) configured as an ECU. The engine E includes sensors (not illustrated) capable of detecting a rotational speed (number of revolutions per unit time) of the crankshaft 1 and the intake camshaft 2 as well as each rotation phase thereof, and the control device is configured to input detection signals of the sensors.

The control device drives the motor M at a speed equal to a rotational speed of the intake camshaft 2 at a time of starting the engine E, thereby maintaining a relative rotational phase. On the other hand, a rotational speed of the motor M is made to be slower than that of the intake camshaft 2, which performs an advance angle operation. Conversely, the rotational speed is increased, and then performing a retard angle operation. As mentioned above, the advance angle operation increases an intake compression ratio, and the retard angle operation decreases the intake compression ratio.

In a case where the motor M rotates at a speed equal to the speed of the outer case 11 (equal to the speed of the intake camshaft 2), an engaging position of the external teeth portions 30A of the input gear 30 with respect to the internal teeth portions 25A of the output gear 25 is not changed, which maintains the relative rotational phase of the driven-side rotational body B with respect to the drive-side rotational body A.

On the other hand, the output shaft Ma of the motor M is driven to rotate at a faster speed or a slower speed than the rotational speed of the outer case 11, which brings the eccentric axis Y in the phase adjustment mechanism C to revolve around the rotational axis X. The revolution displaces the engaging position of the external teeth portions 30A of the input gear 30 with respect to the internal teeth portions 25A of the output gear 25 along an inner periphery of the output gear 25, which applies rotational force between the input gear 30 and the output gear 25. In other words, rotational force centered on the rotational axis X is applied to the output gear 25, and rotational force trying to make rotation around the eccentric axis Y is applied to the input gear 30.

As mentioned above, the engaging protrusions 30T are engaged with the engaging concave portions 43a of the internal engaging arms 43 of the Oldham coupling Cx, and thereby the input gear 30 does not rotate on the axis with respect to the outer case 11 and rotational force of the main body Aa of the drive-side rotational body A is applied to the output gear 25. This rotational force action rotates the output gear 25 and the intermediate member 20 with respect to the outer case 11 around the rotational axis X. This results in setting the relative rotational phase between the drive-side rotational body A and the driven-side rotational body B and achieving a setting of the opening and closing timing by the intake camshaft 2.

Moreover, in a case where the eccentric axis Y of the input gear 30 revolves about the rotational axis X, the Oldham coupling Cx is displaced in a direction where the external engaging arms 42 protrude with respect to the outer case 11 with displacement of the input gear 30, and the input gear 30 is displaced in a direction where the internal engaging arms 43 protrude.

As mentioned above, the number of teeth of the external teeth portions 30A of the input gear 30 is set to be less by one than the number of teeth of the internal teeth portions 25A of the output gear 25. Thus, in a case of one revolution of the eccentric axis Y of the input gear 30 about the rotational axis X, the output gear 25 rotates by one tooth, which achieves a large deceleration.

Thus, it is possible to provide a valve opening-closing timing control device which achieves noise reduction.

Other Embodiments (1) The above embodiments have been described illustrating that the spaced portion 53 is spaced away from the inner peripheral surface of the second bearing 29, forms a space having a predetermined width, and is formed in an arc shape smaller than a radius of curvature of the arc of the first arc portion 51 and the second arc portion 52 around the eccentric axis Y. However, a shape of the spaced portion 53 is not limited to these examples.

Figure 7:
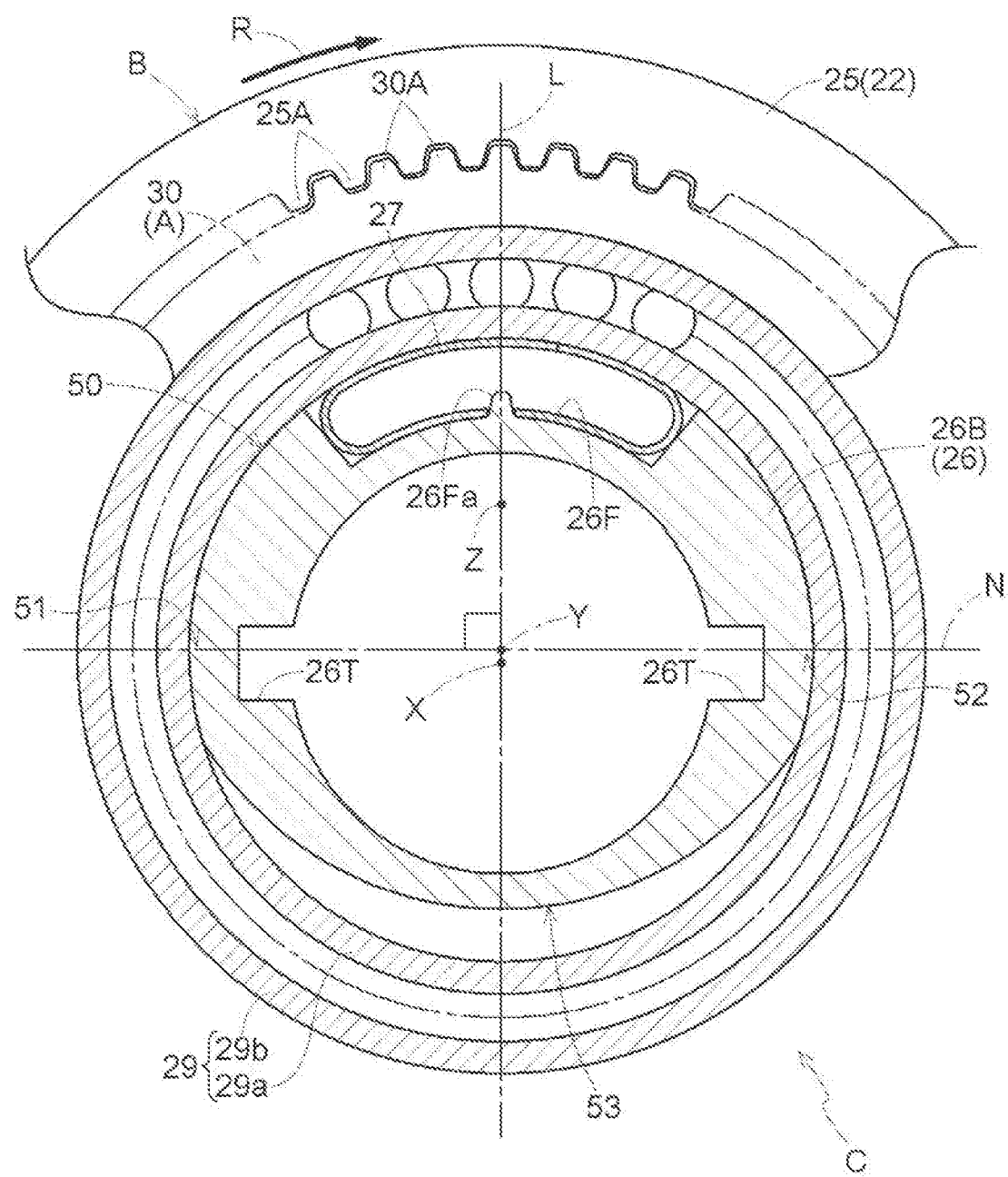
FIG. 7 is an explanatory diagram illustrating another structure of the eccentric supporting surface.

The spaced portion 53 may be formed in an arc having a center different from the eccentric axis Y, and may be formed in an arc shape larger than the radius of curvature of the arc of the first arc portion 51 and the second arc portion 52. For example, as illustrated in FIG. 7, the spaced portion 53 may have a center Z at a side closer to the concave portion 26F in a direction along the line L than the eccentric axis Y and may be formed in an arc shape larger than the radius of curvature of the arc of the first arc portion 51 and the second arc portion 52.

(2) The above embodiments have been described illustrating that the eccentric member 26 is a cylindrical member and includes the second outer peripheral portion 26B outside in the direction along the rotational axis X, the second outer peripheral portion 26B includes the first arc portion 51, the second arc portion 52, the concave portion 26F (an example of a biasing portion) and the spaced portion 53, and the spaced portion 53 is spaced away from the inner peripheral surface of the second bearing 29, forms a space having a predetermined width, and is formed in an arc shape. However, shapes of the eccentric member 26 and the spaced portion 53 are not limited to these examples.

Figure 8:
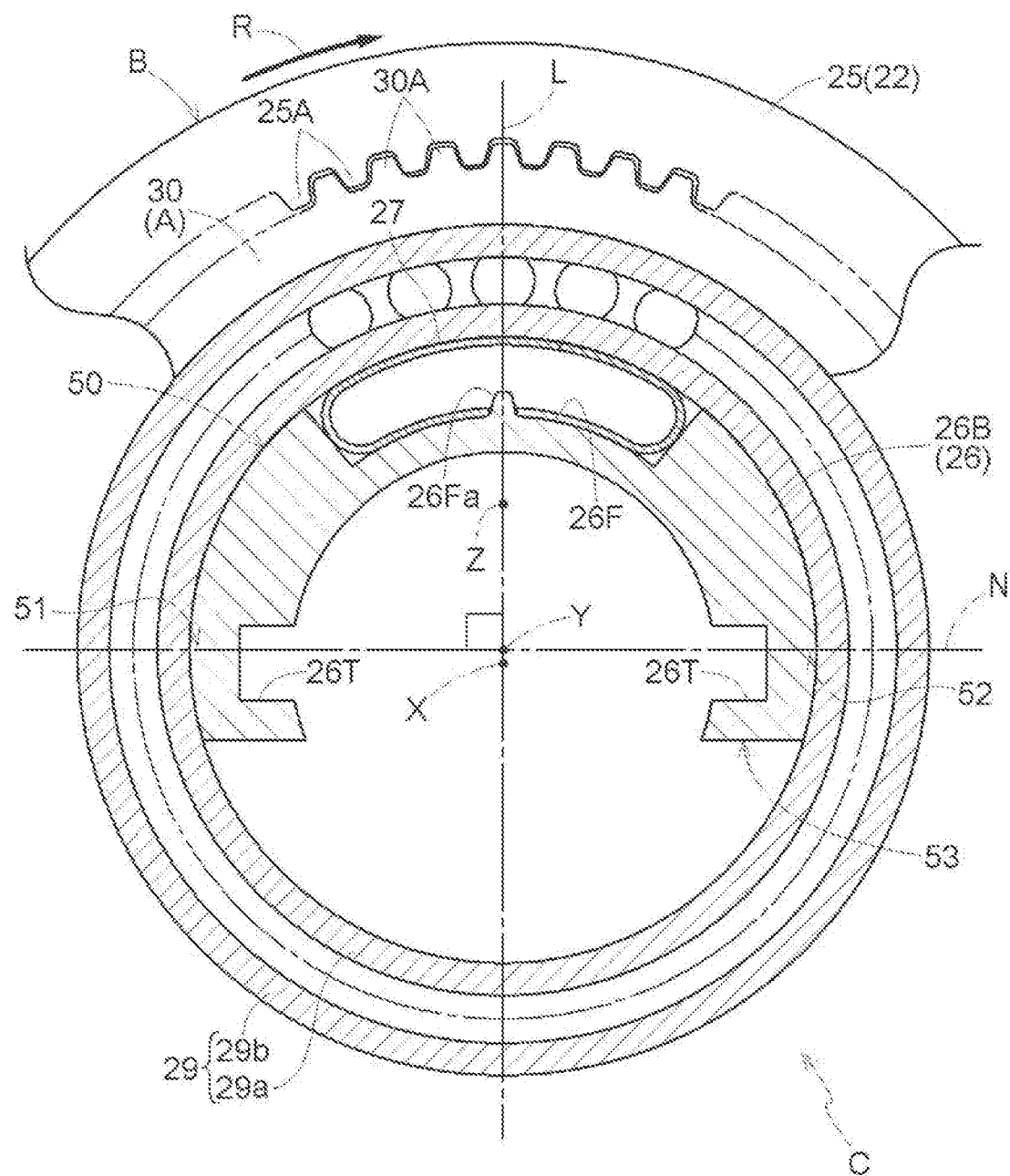
FIG. 8 is an explanatory diagram illustrating still another structure of the eccentric supporting surface.

The second outer peripheral portion 26B of the eccentric member 26 may be formed in a C-shape cutting out a part of a cylinder or a tubular shape, for example, as illustrated in FIG. 8. In this case, the first arc portion 51, the second arc portion 52, and the concave portion 26F are disposed at a portion of a C-shaped arc in the second outer peripheral portion 26B. The cutout portion of the C-shape in the second outer peripheral portion 26B replaces the spaced portion 53. The second outer peripheral portion 26B of the eccentric member 26 is formed in the C-shape, which makes it possible to reduce weight of the cutout portion and make the eccentric member 26 lighter.

(3) The above embodiments have been described illustrating that the spaced portion 53 uses the shape of the precursor of the eccentric member 26 as it is, and surface roughness of the outer peripheral surface of the spaced portion 53 is higher than surface roughness of the outer peripheral surface of the first arc portion 51 and the second arc portion 52 formed by cutting and the like. However, the spaced portion 53 may be formed by cutting and the like. In this case, the spaced portion 53 may be finished by roughing to some extent without a burr, or may be finished at the similar level as surface roughness of the first arc portion 51 and the second arc portion 52.

(4) The above embodiments have been described illustrating that the eccentric member 26 is formed by, for example, cutting a sintered compact of a powder metal, or the like. However, the eccentric member 26 is not limited to a sintered compact of a powder metal. The eccentric member 26 may be formed by cutting out an alloy block which is not a sintered compact, by cutting or the like, and may be formed by a sintered compact of other than metals (ceramics).

(5) The above embodiments have been described illustrating that the eccentric supporting surface 50 of the eccentric member 26 is fitted into the inner ring 29a of the second bearing 29, the eccentric supporting surface 50 biases the second bearing 29 by the plate spring 27 fitted into the concave portion 26F, and the outer peripheral surface of the outer ring 29b of the second bearing 29 is press-fitted into the inner peripheral side of the input gear 30. However, any configuration may be accepted as long as the input gear 30 is externally fitted to the outer peripheral surface (the eccentric supporting surface 50) of the eccentric member 26. For example, the eccentric supporting surface 50 of the eccentric member 26 may be slidably fitted to the inside of the input gear 30 while being free of backlash, and may bias the input gear 30 by the plate spring 27 fitted into the concave portion 26F. This case eliminates need for the second bearing 29, which brings the first arc portion 51 and the second arc portion 52 into sliding contact with the inner peripheral surface of the input gear 30.

This disclosure is applicable to a valve opening-closing timing control device which sets a relative rotational phase between a drive-side rotational body and a driven-side rotational body by driving force of an electric actuator.

A feature configuration of a valve opening-closing timing control device according to this disclosure for achieving the above-described object includes a drive-side rotational body, a driven-side rotational body, and a phase adjustment mechanism. The drive-side rotational body is configured to synchronously rotate with a crankshaft of an internal combustion engine around a rotational axis. The driven-side rotational body is configured to rotate coaxially with the rotational axis and integrally with a valve opening and closing camshaft of the internal combustion engine. The phase adjustment mechanism is configured to set a relative rotational phase of the driven-side rotational body with respect to the drive-side rotational body by driving force of an electric actuator. The phase adjustment mechanism includes an eccentric member being rotated by the electric actuator and having an outer peripheral surface centered on an eccentric axis in a posture parallel to the rotational axis and with a predetermined amount of eccentricity with respect to the rotational axis, a first gear being disposed coaxially with the rotational axis, having a first cylindrical portion to which internal teeth portions are formed on an inner periphery, and being rotated integrally with the driven-side rotational body, and a second gear being externally fitted to the outer peripheral surface of the eccentric member and being rotated around the eccentric axis. The second gear includes a second cylindrical portion having an outer periphery formed with external teeth portions, the number of teeth of the external teeth portions being less than the number of teeth of the first gear, and an inner periphery into which the eccentric member is fitted, fits the second cylindrical portion inside the first cylindrical portion, applies a bias toward the first gear from inside of the second cylindrical portion by the eccentric member and engages with the first gear, and brings the eccentric axis to revolve around the rotational axis by rotation of the eccentric member, changes an engaging position with the first gear, and alters the relative rotational phase. The eccentric member includes the outer peripheral surface with a first arc portion entirely along the second cylindrical portion, a second arc portion entirely along the second cylindrical portion and discontinuous from an arc of the first arc portion, a biasing portion disposed between the first arc portion and the second arc portion in a peripheral direction of the eccentric member, and a spaced portion disposed between the first arc portion and the second arc portion on an opposite side of the biasing portion with respect to the eccentric axis and spaced away from the second cylindrical portion. Each of the first arc portion and the second arc portion is disposed from a position less than 90 degrees to a position more than 90 degrees at a central angle with respect to the eccentric axis from a biasing direction of the biasing portion in the peripheral direction.

According to the configuration described above, the eccentric member includes, on the outer peripheral surface, the first arc portion, the biasing portion, the second arc portion, and the spaced portion in this order. The second arc portion is formed as an arc portion separate from the first arc portion, but the first arc portion and the second arc portion are both along so as to smoothly come into contact with the inside of the second cylindrical portion of the second gear. Each of the first arc portion and the second arc portion is overlapped with an arc of the same imaginary circle, for example.

According to the configuration described above, each of the first arc portion and the second arc portion is disposed from a position less than 90 degrees to a position more than 90 degrees as a central angle with respect to the eccentric axis from the biasing direction of the biasing portion, in the peripheral direction of the eccentric member. In other words, each of the first arc portion and the second arc portion intersects with at least a direction orthogonal to the biasing direction and is disposed in both a side closer to the biasing portion as the central angle with respect to the eccentric axis from the direction orthogonal to the biasing direction and a side far from the biasing portion. Moreover, the second arc portion is disposed on the opposite side of the first arc portion with respect to the eccentric axis in the peripheral direction. Accordingly, the second gear receives regulation of a displacement in both the directions orthogonal to the biasing direction of the biasing portion at the inside of the second cylindrical portion, by the first arc portion and the second arc portion. Therefore, the second gear receives regulation of the displacement in a direction where a gap between the external tooth portion and the internal tooth portion of the first gear is reduced, during driving of the electric actuator or at a time of generating cam fluctuation torque according to a rotational fluctuation of the camshaft. This avoids contact and collision of the internal tooth portion and the external tooth portion with each other and prevents generation of abnormal noise with the collision, which makes it possible to reduce noise.

According to the configuration described above, since the first arc portion and the second arc portion are disposed from the position less than 90 degrees to the position more than 90 degrees as the central angle with respect to the eccentric axis from the biasing direction of the biasing portion in the peripheral direction of the eccentric member, each of the first arc portion and the second arc portion includes an arc portion having a predetermined width on the right and left sides in the peripheral direction of the eccentric member from the direction orthogonal to the biasing direction and comes into face-to-face contact with an inner surface of the second cylindrical portion. This allows for inhibiting wear-down of the first arc portion and the second arc portion and preventing generation of abnormal noise for a long time in comparison with a case where the first arc portion and the second arc portion come into point or line contact with the inner surface of the second cylindrical portion. Note that, according to the configuration described above, the arc portion having a predetermined width is provided on the right and left sides in a rotational direction of the eccentric member from the direction orthogonal to the biasing direction, and thereby the maximum diameter of the eccentric member can be measured in a simple direction such as holding by the first arc portion, the second arc portion, and a vernier caliper and the like. This also leads to a merit of facilitating manufacture and quality control of the eccentric member.

According to the configuration described above, the eccentric member is disposed between the first arc portion and the second arc portion on the opposite side of the biasing portion with respect to the eccentric axis and has the spaced portion spaced away from the second cylindrical portion, and thereby the eccentric member can move in the biasing direction. Therefore, the biasing portion has an elastic member such as a spring, which allows for maintaining predetermined biasing force while moving in the biasing direction with respect to the second cylindrical portion, biasing the second cylindrical portion in the biasing direction, and engaging the second gear with the first gear.

Note that the first arc portion and the second arc portion are preferably processed into smooth and precise arc-shaped surfaces (surfaces of high-roundness) in order to come into face-to-face contact with the inner surface of the second cylindrical portion. For example, the first arc portion and the second arc portion are preferably formed by relatively highly precise cutting out processing such as cutting. Thus, the first arc portion and the second arc portion require smooth arc-shapes along the inner surface of the second cylindrical portion in order to come into face-to-face contact with the inner surface of the second cylindrical portion. It is sufficient that the spaced portion has a space for allocating a movable range of the eccentric member. Therefore, a surface of the spaced portion may be formed by rough processing in comparison with the first arc portion and the second arc portion. For example, a base material of the eccentric member is formed by sintering of a metal powder, the first arc portion and the second arc portion are formed into smooth arc surfaces by cutting out processing, and the spaced portion can, on the other hand, leave a surface formed by sintering of a metal powder. Moreover, it is preferable that a case of processing into an arc-shaped surface makes highly precise processing possible in comparison with a case of processing into an elliptical shape, and also facilitates measurement and determination of the shape.

A further feature configuration of the valve opening-closing timing control device according to this disclosure is that the spaced portion includes an arc portion whose radius of curvature is smaller than the radius of curvature of the first arc portion.

According to the configuration described above, the arc portion of the spaced portion can be spaced away from the inner surface of the second cylindrical portion by a predetermined distance or more. Moreover, strength of the eccentric member can be reinforced by the arc portion.

A further feature configuration of the valve opening-closing timing control device according to this disclosure is that the spaced portion includes an arc portion whose radius of curvature is larger than the radius of curvature of the first arc portion.

According to the configuration described above, the arc portion of the spaced portion can be spaced away from the inner surface of the second cylindrical portion. Moreover, strength of the eccentric member can be reinforced by the arc portion.

A further feature configuration of the valve opening-closing timing control device according to this disclosure is that the eccentric member is formed in a C-shape cutting out a part from an anular shape. The first arc portion and the second arc portion are a part of an arc of the C-shape. The spaced portion is a cutout portion cut out from the anular shape.

According to the configuration described above, the spaced portion is formed as a cutout portion, and the eccentric member can be provided with a portion spaced away from the inner surface of the second cylindrical portion. The eccentric member can be decreased in weight.

A further feature configuration of the valve opening-closing timing control device according to this disclosure is that the eccentric member is a metallic sintered compact, and each arc surface of the first arc portion and the second arc portion is a cutting surface.

According to the configuration described above, the first arc portion and the second arc portion whose surfaces are along the second cylindrical portion are formed highly precisely by cutting out by using cutting scheme, and the spaced portion where surface roughness of the surface does not affect the second cylindrical portion reduces processing cost by utilizing a shape or a surface at a time of sintering as it is, which makes it possible to achieve both high precision and low cost.

A further feature configuration of the valve opening-closing timing control device according to this disclosure is that surface roughness of each arc surface of the first arc portion and the second arc portion is smaller than surface roughness of a surface of the spaced portion.

According to the configuration described above, the surfaces of the first arc portion and the second arc portion whose surfaces are along the second cylindrical portion are formed highly precisely, and the spaced portion where surface roughness of the surface does not affect the second cylindrical portion is roughly processed or unprocessed and reduces processing cost, which makes it possible to achieve both high precision and low cost.

A further feature configuration of the valve opening-closing timing control device according to this disclosure is that an elastic member is fitted into the biasing portion. Moreover, the elastic member is configured by a plate spring or such a pair of bending members that a spring plate member is bent into a U-shaped form.

According to the configuration described above, the biasing portion has an elastic member such as a spring, which allows for maintaining predetermined biasing force while moving in the biasing direction with respect to the second cylindrical portion, biasing the second cylindrical portion in the biasing direction, and engaging the second gear with the first gear.

A further feature configuration of the valve opening-closing timing control device according to this disclosure is that the biasing portion is formed with a guide protrusion configured to place the elastic member at a predetermined position.

According to the configuration described above, the elastic member can be placed at a predetermined position by the guide protrusion formed to the biasing portion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve opening-closing timing control device, comprising:
   a drive-side rotational body configured to synchronously rotate with a crankshaft of an internal combustion engine around a rotational axis;
   a driven-side rotational body configured to rotate coaxially with the rotational axis and integrally with a valve opening and closing camshaft of the internal combustion engine; and
   a phase adjustment mechanism configured to set a relative rotational phase of the driven-side rotational body with respect to the drive-side rotational body by driving force of an electric actuator,
   wherein the phase adjustment mechanism includes:

an eccentric member being rotated by the electric actuator and having an outer peripheral surface centered on an eccentric axis in a posture parallel to the rotational axis with a predetermined amount of eccentricity with respect to the rotational axis, a first gear being disposed coaxially with the rotational axis, having a first cylindrical portion to which internal teeth portions are formed on an inner periphery, and being rotated integrally with the driven-side rotational body, and a second gear being externally fitted to the outer peripheral surface of the eccentric member and being rotated around the eccentric axis, wherein the second gear includes a second cylindrical portion having an outer periphery formed with external teeth portions, a number of teeth of the external teeth portions being less than a number of teeth of the internal teeth portions of the first gear, and an inner periphery into which the eccentric member is fitted, the second cylindrical portion fitting inside the first cylindrical portion, wherein the second gear is configured to apply a bias toward the first gear from inside of the second cylindrical portion by the eccentric member and engage with the first gear, wherein the second gear is configured to bring the eccentric axis to revolve around the rotational axis by rotation of the eccentric member, change an engaging position with the first gear, and alter the relative rotational phase, wherein the outer peripheral surface includes:
  a first arc portion entirely along the second cylindrical portion,
  a second arc portion entirely along the second cylindrical portion and discontinuous from an arc of the first arc portion,
  a biasing portion disposed between the first arc portion and the second arc portion in a peripheral direction of the eccentric member, and
  a spaced portion disposed between the first arc portion and the second arc portion on an opposite side of the biasing portion with respect to the eccentric axis and spaced away from the second cylindrical portion, wherein each of the first arc portion and the second arc portion is disposed from a position less than 90 degrees to a position more than 90 degrees as a central angle with respect to the eccentric axis from a biasing direction of the biasing portion, in the peripheral direction, and wherein the spaced portion includes an arc portion whose radius of curvature is smaller than a radius of curvature of the first arc portion.

2. The valve opening-closing timing control device according to claim 1, wherein
the eccentric member is a metallic sintered compact, and each arc surface of the first arc portion and the second arc portion is a cutting surface.

3. The valve opening-closing timing control device according to claim 1, wherein surface roughness of each arc surface of the first arc portion and the second arc portion is smaller than surface roughness of a surface of the spaced portion.

4. The valve opening-closing timing control device according to claim 1, wherein an elastic member is fitted into the biasing portion.

5. The valve opening-closing timing control device according to claim 4, wherein the elastic member is configured by a plate spring.

6. The valve opening-closing timing control device according to claim 4, wherein the elastic member is configured by such a pair of bending members that a spring plate member is bent into a U-shaped form.

7. The valve opening-closing timing control device according to claim 6, wherein the biasing portion is formed with a guide protrusion portion configured to place the elastic member at a predetermined position.

8. A valve opening-closing timing control device, comprising:
a drive-side rotational body configured to synchronously rotate with a crankshaft of an internal combustion engine around a rotational axis;
a driven-side rotational body configured to rotate coaxially with the rotational axis and integrally with a valve opening and closing camshaft of the internal combustion engine; and
a phase adjustment mechanism configured to set a relative rotational phase of the driven-side rotational body with respect to the drive-side rotational body by driving force of an electric actuator,
wherein the phase adjustment mechanism includes:
  an eccentric member being rotated by the electric actuator and having an outer peripheral surface centered on an eccentric axis in a posture parallel to the rotational axis with a predetermined amount of eccentricity with respect to the rotational axis,
  a first gear being disposed coaxially with the rotational axis, having a first cylindrical portion to which internal teeth portions are formed on an inner periphery, and being rotated integrally with the driven-side rotational body, and
  a second gear being externally fitted to the outer peripheral surface of the eccentric member and being rotated around the eccentric axis,
wherein the second gear includes a second cylindrical portion having an outer periphery formed with external teeth portions, a number of teeth of the external teeth portions being less than a number of teeth of the internal teeth portions of the first gear, and an inner periphery into which the eccentric member is fitted, the second cylindrical portion fitting inside the first cylindrical portion,
wherein the second gear is configured to apply a bias toward the first gear from inside of the second cylindrical portion by the eccentric member and engage with the first gear,
wherein the second gear is configured to bring the eccentric axis to revolve around the rotational axis by rotation of the eccentric member, change an engaging position with the first gear, and alter the relative rotational phase,
wherein the outer peripheral surface includes:
  a first arc portion entirely along the second cylindrical portion,
  a second arc portion entirely along the second cylindrical portion and discontinuous from an arc of the first arc portion,
  a biasing portion disposed between the first arc portion and the second arc portion in a peripheral direction of the eccentric member, and
  a spaced portion disposed between the first arc portion and the second arc portion on an opposite side of the biasing portion with respect to the eccentric axis and spaced away from the second cylindrical portion, wherein each of the first arc portion and the second arc portion is disposed from a position less than 90 degrees to a position more than 90 degrees as a central angle with respect to the eccentric axis from a biasing direction of the biasing portion, in the peripheral direction, and wherein the spaced portion includes an arc portion whose radius of curvature is larger than the radius of curvature of the first arc portion.

* * * * *